July 16, 1968

G. B. CLARK ET AL 3,392,840

TUBULAR REVERSE OSMOSIS APPARATUS

Filed Dec. 28, 1965

INVENTORS.
GEORGE B. CLARK
SEROP MANJIKIAN

BY

Agent

INVENTORS.
GEORGE B. CLARK
SEROP MANJIKIAN

United States Patent Office 3,392,840
Patented July 16, 1968

3,392,840
TUBULAR REVERSE OSMOSIS APPARATUS
George B. Clark, Poway, and Serop Manjikian, Del Mar,
Calif., assignors to Universal Water Corporation, Del
Mar, Calif., a corporation of California
Filed Dec. 28, 1965, Ser. No. 516,977
8 Claims. (Cl. 210—321)

ABSTRACT OF THE DISCLOSURE

Apparatus for treatment of solutions by reverse osmosis, which is formed of a porous body having a number of longitudinal bores lined with semipermeable membranes. The body is provided with end flanges, end plates and interposed seals, in which are channels to connect the end of one such bore with a pipe supplying solution to be treated under pressure, to connect the end of another bore with a pipe for concentrate exhaust, and to connect the ends of other bores to form a continuous passageway through the body.

---

This invention relates to apparatus for treating a solution to reduce the concentration of a solute or other material contained therein, and more particularly to effecting such concentration reduction by reverse osmosis. The invention is especially applicable to the treatment of brackish water or sea water to produce a water product comparable to commercial fresh water as well as to the treatment of many other types of solutions to lower the solute content thereof or effect selective separation of solutes.

The prior art has shown that reverse osmosis is a useful process for separating salts and other solutes from solutions. As is well known, osmosis as it occurs in nature can be demonstrated by separating a salt-containing solution and a pure solvent by means of a semi-permeable membrane. The solvent will pass through the membrane to equalize the salt concentrations on each side of the membrane or increase the pressure on the more concentrated side. The pressure difference at which the net flow of solvent is zero is defined as the osmotic pressure; and it is directly related to the concentration of the dissolved salts. It has been shown that if a pressure in excess of the osmotic pressure is applied to the concentrated solution, the flow of solvent can be reversed, i.e., the solvent flow will be from the concentrated to the dilute side. This process has come to be termed reverse osmosis; and as a result of the process, relatively pure solutions can be made to pass through a membrane while the original solution becomes correspondingly more concentrated with respect to the solute originally contained therein.

Commercial use of the principle of reverse osmosis has not, however, been rapidly developed. Although the basic principles have been recognized for many years, reverse osmosis is, even today, not much more than a laboratory curiosity. This has occurred because of the nature of the separating mechanism and lack of much background and experience with it. The physico-chemical aspects of the passage of the solvent through the membrane, while retaining the solute in the original solution, are not well understood; and troublesome problems have been encountered in designing apparatus for applying suitable pressure to the solution to force the solvent through the thin, porous, and necessarily delicate semi-permeable membrane. Since the solvent does not pass rapidly through a membrane designed to prevent passage of ions or compounds in solution, output or flow through a typical reverse osmosis system has generally been disappointingly low and hardly suitable for large scale commercial usage, where production rate is an important industrial consideration.

Reverse osmosis apparatus, in addition to being designed to operate under the necessary high pressure, must also be fabricated of materials to resist corrosive effects of solutions being treated.

Summarized briefly, this invention provides apparatus for treating a solution by the process of reverse osmosis, which will provide improved efficiency and production of solution of reduced solute content. The invention is adapted for large scale, commercial operation; and the apparatus is particularly useful for employment as a single module or a component of a system comprising a multiplicity of such modules. According to the invention, a solution to be treated is introduced under relatively high, hyperatmospheric pressure (many times atmospheric) into one end of an elongated continuous passageway lined with a semi-permeable membrane. A plurality of tubular bores in a porous body are connected by end sealing members to form such a continuous passageway. Preferably, the porous body is of relatively inexpensive and easily fabricated material, such as ceramic. To provide such a body with necessary strength to withstand a high internal pressure, a porous reinforcing wrapping may be employed around the outside of the body. A portion of the solution containing a higher concentration of a solute originally contained therein is released at a controlled rate from the other end of said passageway while a portion passing through the semi-permeable membrane and the porous body is collected as a solution containing a reduced concentration of such solute.

The terms "solute" and "solution" are employed herein in their broadest sense to include salts, ions and compounds dissolved in a solvent, as well as finely divided matter held in suspension or contained in a solvent to form a solution. Solutes may include inorganic and organic salts and compounds forming what are described as true solutions and various substances or matter in such finely divided condition to form a colloidal solution or dispersed system.

The construction and operation of the apparatus of this invention will be apparent from the following detailed description thereof taken with reference to the annexed drawings, in which.

Figure 1:
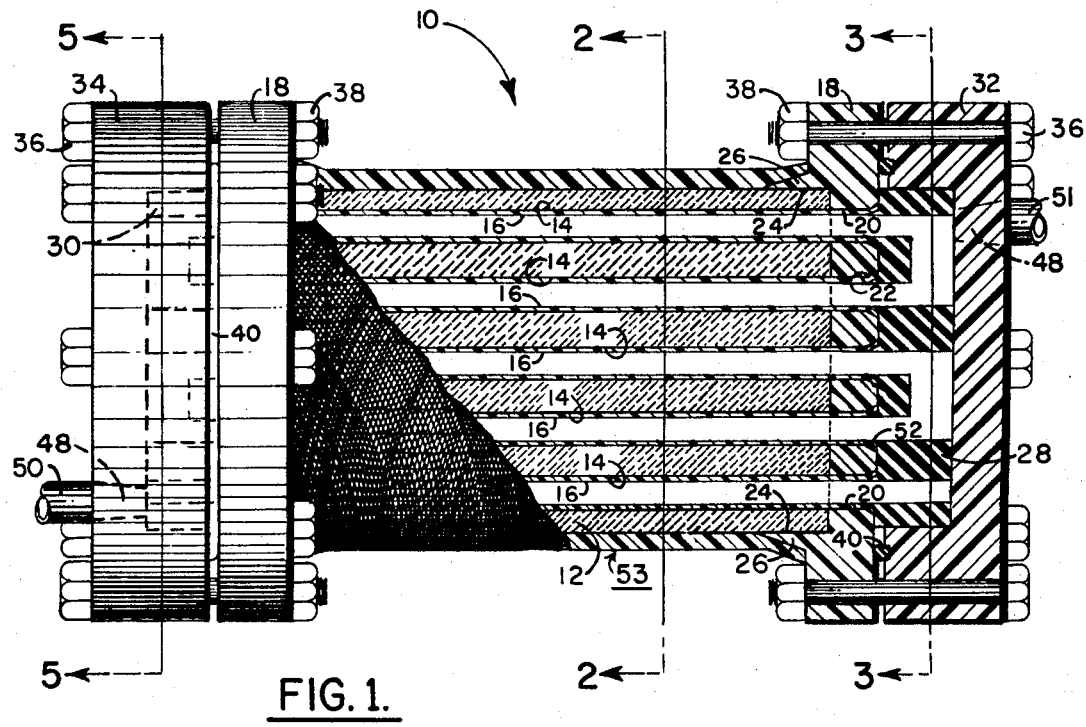
FIG. 1 is a side elevation view of apparatus embodying features of this invention, partly sectioned to show a central, vertical section of one end.
Figure 2:
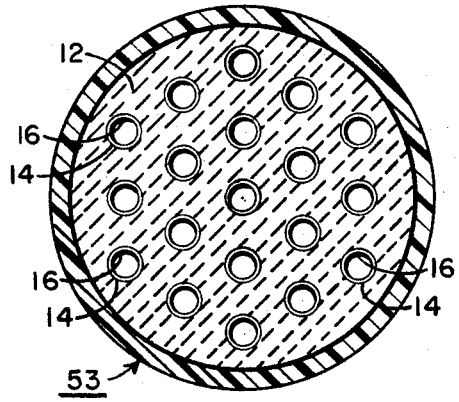
FIG. 2 is a vertical section of the apparatus of FIG. 1 taken along the line 2—2.

Referring now to FIGS. 1 and 2, the filtering unit or module 10 comprises a porous body 12 provided with a plurality of spaced apart tubular bores 14, each lined with a tubular semi-permeable membrane 16, nineteen bores being shown in the embodiment illustrated. Body 12 is fabricated of porous material to permit transudation of liquid, and membranes 16 are fabricated of material adapted to pass solvent therethrough but to hold back ions, molecules or other particles which it is desired to separate or concentrate.

Fixedly attached to each end of body 12 is a flange 18 which is perforated as at 20 to form therethrough extensions of each of bores 14. The outer ends of perforations 20 are flared as at 22 and tubular membrane 16 in each of bores 14 is arranged to extend through perforations 20 and to overlay flared portions 22.

Flanges 18 are constructed of suitably strong and impervious material such as synthetic resin, preferably polyester or epoxy resin reinforced with glass fibers. They are fixedly attached to the ends of body 12 which they surround, as by cementing by means of an epoxy base adhesive forming strong, tight joint 24. Tapered flange extensions 26 are arranged to provide additional contact and cementing surface between the flange and adjacent body portions.

Arranged to abut against the portions of flanges 18, which are aligned with the ends of body 12, are resilient seals 28 and 30, of rubber or similar material, which seal the ends of the assembly of body membranes and flanges to end plates 32 and 34, which are also fabricated of strong and impervious material such as synthetic resin, preferably fiberglass. Since the seals and end plates are not precisely identical, and are located in opposite ends of the module, they are numbered separately, for each end; and, in the embodiment illustrated, seal 28 and end plate 32 are shown at the right hand end of the module and seal 30 and end plate 34 at the left hand end of the module. End plates 32 and 34 are firmly tightened against the end faces of corresponding flanges 18 by means of bolts 36 and nuts 38. O ring seals 40 are placed in suitable grooves in ends 32 and 34 to insure complete tightness when the flanges and end plates are tightened together.

Figure 3:
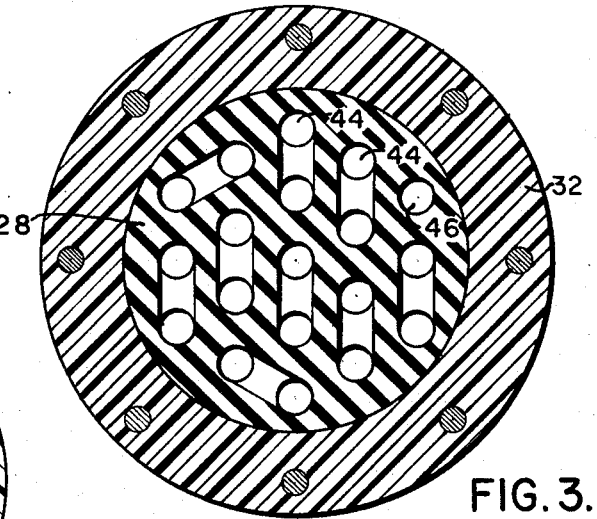
FIG. 3 is a vertical section of the apparatus of FIG. 1 taken along the line 3—3.
Figure 5:
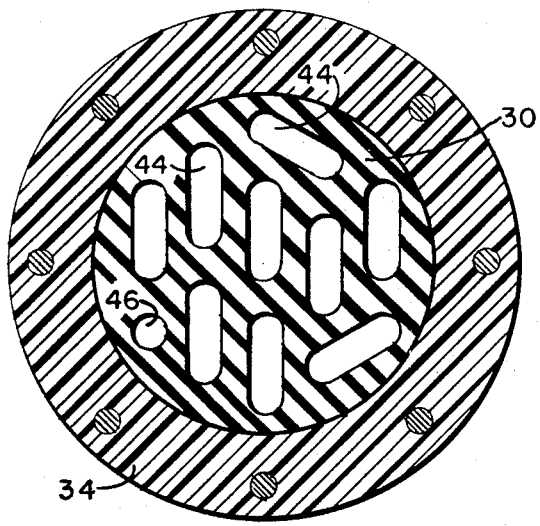
FIG. 5 is a vertical section of the apparatus of FIG. 1 taken along the line 5—5.
Figure 4:
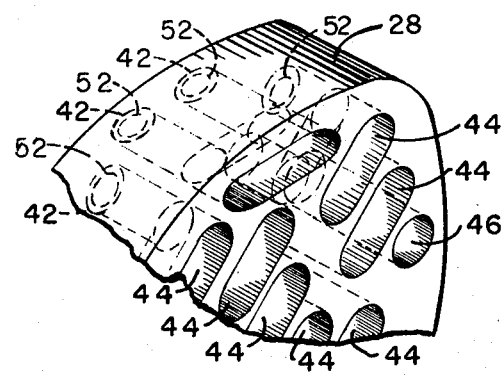
FIG. 4 is an enlarged perspective view of a portion of the seal shown in the right hand end of the apparatus of FIG. 1.

Reference to FIGS. 3, 4 and 5 will be helpful towards an understanding of the details of construction of resilient seals 28 and 30. Their function is to seal the ends of body 12 to end plates 32 and 34 and also to provide channels between certain of bores 14 so that these may be interconnected to form a continuous passageway. In FIG. 4 it will be seen that tubular holes are provided as at 42 aligned with each of the tubular bores 14 in body 12 and extending from one face part way through seal 28. These holes 42 are connected in pairs by channels 44 in the other face of seal 28 as shown. In each of seals 28 and 30 there will be one hole starting from the same face as those identified as 44, but extending completely through seal 28 as shown at 46. A continuous passageway can be traced starting with hole 46 in seal 30 back and forth through bores 14 in body 12, these bores 14 being interconnected in pairs at each end by channels 44 and ending with holes 46 in seal 28. A communicating threaded hole 48 is provided in each of end plates 32 and 34 into which are threaded pipes 50 and 51 to serve as conduits to provide a supply and exhaust, as the case may be, of solution into and out of the module 10. Holes 46 in seals 28 and 30, and holes 48 in end plates 32 and 34, constitute means for connecting these conduits with bores 14.

Figure 6:
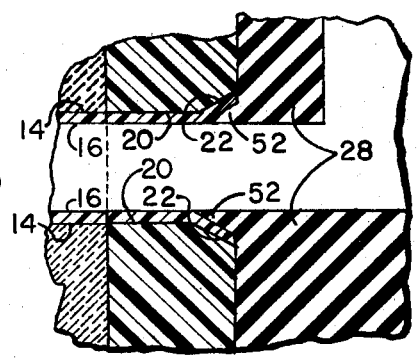
FIG. 6 is an enlarged view showing in more detail arrangement of the semi-permeable membranes in the bores of the body of the apparatus.

Seals 28 and 30 are designed with tapered rings 52 extending from walls of holes 42 to mate with the flared portions 22 of holes 20 in flanges 18. As will be seen most clearly in FIG. 6, these extending tapered rings are arranged on the inside of the ends of the tubular membranes which themselves overlay the flared ends 22 of flange holes 20. Tightening bolts and nuts 36 and 38 to place seals 28 and 30 in compressed relationship between end plates 32 and 34 and their corresponding flanges 18 will provide very high sealing pressure as a wedging action between rings 52 and flared ends 22 of holes 20 with the ends of tubular membranes 16 being tightly maintained in position and effectively sealed to prevent leakage of solution around the ends of the membrane tubes.

Figure 7:
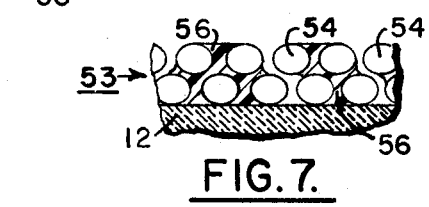
FIG. 7 is a much enlarged view showing details of a section of the reinforcement around the outer surface of the body of the apparatus.

Since the solution passed through the module 10 will be maintained under high pressure to promote effective separation, the body 10 will be subjected to substantial internal pressure. To insure against fracture, it is preferred, particularly when using a ceramic body and high pressure as when desalting sea water, to reinforce body 12 against the internal pressure by providing a strong porous wrapping, indicated generally at 53, tensioned against its outer surface. This is accomplished in the embodiment illustrated by wrapping the outer surface of body 12 with glass fiber roving as at 54 seen in FIG. 7. Two layers of roving may be applied to form crossed helical windings around the outer surface of body 12 as shown to provide reinforcement against longitudinal as well as hoop stresses. The windings are wrapped with the roving under tension to provide tensioned reinforcement, and the wrapping is preferably extended to cover also the tapered ends 26 of flanges 18. A catalyst-setting polyester or epoxy resin as at 56 is applied to the wrappings to bond these to the surface of body 12 and to bond them together as a unit. The amount of resin applied is, however, restricted to less than that required to completely saturate the windings and to form a solid impervious body. The glass and resin are proportioned to provide a "resin-lean" mixture which leaves spaces and pores between the roving windings and layers so that liquid passing through membranes 16 and porous body 12 may freely pass through the outer tensioned reinforcement, as may be more clearly seen in FIG. 7.

Figure 8:
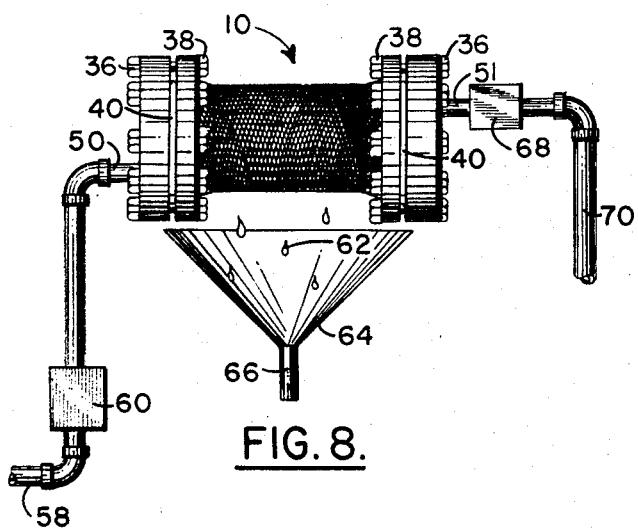
FIG. 8 shows a general schematic illustration of a reverse osmosis filtering system employing the apparatus of FIG. 1.

In operation, the module 10 is arranged as part of a solution purifying system which, for example, may constitute means for desalting sea water, shown schematically in FIG. 8. Referring now to FIG. 8, sea water containing 3.5% dissolved salts (35,000 parts per million) is supplied through feed pipe 58 to pump 60, which supplies this water under pressure of about 1200 pounds per square inch and at a rate of 1800 gallons per day to the input pipe 50 of module 10. The sea water flows through the continuous passageway in body 12 formed by bores 14 therein; and due to the pressure applied, relatively fresh water will pass through the walls of membrane tubes 16, which, it will be understood, will be of suitable material, such as cellulose acetate prepared to provide selective separation and retention of sodium chloride and other salts and passage of purified or fresh water. The purified water, after passing through the walls of membrane tubes 16, transduces porous body 12 and its outer reinforcement of glass roving 54 and resin 56 and emerges as at 62 to be collected in pan 64 to produce the purified or fresh water product flowing from product pipe 66. The purified water produced may, for example, contain less than 500 parts per million of salts and thus is of purity to be acceptable as potable, fresh water, and amounts to 1200 gallons per day from the original 1800 gallons of sea water pumped.

The other portion of the sea water solution, from which the fresh product water has been extracted, flows out of module 10 through output pipe 51 into and through pressure valve 68. This pressure valve 68 is set to maintain a predetermined pressure of solution in module 10 and releases solution at a controlled rate so that solution pressure in the module is maintained. In the case of desalinization of sea water, the pressure may be of the order of 1200 to 1500 p.s.i. For other types of solutions, lower or higher pressures may be employed depending on their nature and speed of flow desired; but pressures will ordinarily be above 300 pounds per square inch. For solutions of low salt or impurity content, lower pressures are often employed. The action of pump 58 is arranged to supply solution at slightly higher pressure than the setting of pressure valve 68 and in sufficient volume so that a continuous outflow of concentrated salt solution is continually passed through pressure valve 68 while fresh water is passed through the membrane tubes 16 and body 12 as described above. The concentrated solution outflowing from pipe 70 will amount to 600 gallons per day and will contain salts from the sea water feed concentrated to 10.4%. This solution may be discarded if the purified water is the only desired product, or may be treated by known methods for recovery of its salt content.

Materials of construction are important features of this invention. The semi-permeable membrane tubes 16 may be produced as tubular bodies by any convenient method, advantageously by forming these from a solution of cellulose acetate in a solvent such as acetone, with a conditioning agent such as formamide, and allowing the solvent to partially evaporate, then removing the remainder by water leaching.

Seals 28 and 30 are of rubber or similar material, being strong, resilient, impervious and readily fabricated to desired shape. A silicone rubber composition available under the trade name "Silastic" is readily cast into suitable molds to form seals of necessary strength, resilience and imperviousness.

Unique and important advantages accrue from fabrication of body 12 of porous ceramic material. Such a body may be produced by known methods, as by extruding, casting, molding or otherwise forming a paste or mud of ball clay or other clays or conventional ceramic ingredients, to desired configuration, and firing. The ceramic body should be similar to unglazed tile or pottery with adequate porosity to provide useful liquid transfer. Such a ceramic body can form a desirable support for the relatively delicate semi-permeable membrane tubes, and can readily be produced to be usefully porous. The porous ceramic body is, as will be evident, continuously porous, that is pores or liquid passages are present more or less uniformly throughout. The degree of porosity can be controlled by the particular structure produced. Methods for producing ceramic bodies with various degrees of porosity are known in the art. The clay mix may, for example, include some powdered organic material which, when the body is fired, burns to leave residual pores and passages. Fineness and type of other constituents and also the firing temperature can be used to control porosity.

While high porosity in body 12 is desirable to provide best liquid flow, this is ordinarily accompanied by relatively low strength. Generally speaking, the higher the porosity, the lower the strength. Therefore, when highest flow is desirable and highest porosity is required, body 12 may advantageously be provided with a reinforcing outer wrapping as described. Such an arrangement is preferred also if relatively high pressure is applied to the solution being treated. Required solution pressure is dependent on, among other factors, the desired flow-through rate and the character and concentration of the salts or other matter being separated or concentrated. For treating solutions of brackish or impure water, for example, that contain low concentrations of dissolved salts, relatively low pressures of the order of several hundred pounds per square inch may be adequate to provide a satisfactory flow through a module having a body of high porosity ceramic. Under these conditions, a ceramic body having suitable porosity as well as sufficient strength may be employed. However, for safety reasons, a reinforcing wrapping is preferred when solution pressure of over about 300 pounds per square inch is employed. The ceramic body is not affected or corroded by solutions being treated in the apparatus, and from this viewpoint is the equivalent of expensive corrosion resistant materials, such as high quality stainless steels or other even more expensive corrosion resisting metals. Furthermore, steel or other metal parts must be drilled or perforated to provide porosity at additional heavy expense. The low cost, corrosion resistance and intrinsic porosity of a ceramic body as described provides a unique combination of these important and advantageous characteristics. Such a body does not, of course, possess high tensile strength, but this can be readily bolstered at small additional expense by provision of a reinforcing outer wrapping.

The apparatus of this invention is well adapted for treating a solution to reduce the concentration of substances dissolved or suspended therein. As a result of such treatment, a purified solution or liquid is obtained with the residual solution containing a correspondingly increased concentration of the dissolved or suspended material. It is useful, for example, for treating sea water to produce potable water, brackish water to separate unwanted dissolved salts and suspended materials, and solutions of suspended or dissolved organic materials to eliminate substances affecting taste and odor. In addition, since reverse osmosis produces a solution more concentrated with respect to some contained material, this more concentrated solution may, in some applications, constitute the principal product. Thus, the invention may be useful in the production of concentrated salt solutions, as well as fruit and juice concentrates containing appreciably lowered water content. It is significant that a wide variety of solutions may be treated, including true solutions of ions and compounds, colloidal solutions and dispersions, and solutions containing suspended fine particulate matter.

We claim:
1. Apparatus for treating a solution to separate a portion thereof containing a reduced concentration of a solute originally contained in said solution, and a portion containing a higher concentration of said solute, which comprises:
   (1) A porous body of material inert to said solution having a plurality of spaced apart bores extending from end to end therethrough;
   (2) a semipermeable membrane lining each of said bores;
   (3) end sealing members including,
      (a) end plates attached to said body, and,
      (b) resilient seals interposed between said end plates and overlapping at least in part the ends of semipermeable membranes lining said bores, said end sealing members having;
   (4) means for connecting one end of one of said bores with a conduit to supply said solution under pressure to the interior of one of said bores;
   (5) means for connecting one end of another of said bores with a conduit to exhaust solution from said other of said bores; and,
   (6) means connecting ends of said bores to form a continuous passageway through said body.

2. Apparatus according to claim 1 in which said porous body is fabricated of continuously porous ceramic material.

3. Apparatus according to claim 2 in which said ceramic body is reinforced against internal pressure of said solution by a strong, porous wrapping tensioned against the outer surface of said body.

4. Apparatus according to claim 3 in which said porous wrapping is of resin-lean fiber glass.

5. Apparatus according to claim 4 in which said body has 19 uniformly spaced-apart bores.

6. Apparatus according to claim 1 in which said sealing members include resilient seals maintained in compressed relationship between the ends of said porous body and said end plates, said seals overlapping at least in part the ends of semipermeable membranes lining said bores, said seals having at least one channel in a surface thereof, said channels being of size and location to provide connections from one to another of the ends of said bores.

7. Apparatus according to claim 6 in which said resilient seals include means for providing flow of solution into and out of said passageway in said porous body.

8. Apparatus according to claim 1 in which means are provided to connect said bores to form a single, continuous passageway back and forth from end to end through said body.

References Cited

UNITED STATES PATENTS 635,934 10/1899 Key _____ 210—496 X
3,339,341 9/1967 Maxwell et al. _____ 55—158 X

OTHER REFERENCES

"Sea Water Conversion," by Havens Industries, March 1964, 10 pages.

REUBEN FRIEDMAN, *Primary Examiner.*

SAMIH N. ZAHARNA, *Examiner.*

F. SPEAR, *Assistant Examiner.*